United States Patent [19]

Klingel, Sr.

[11] Patent Number: 4,519,618

[45] Date of Patent: May 28, 1985

[54] MULTI-CHARACTERISTICS SEAL MEMBER FOR TESTING UNCAPPED CONTAINER MEANS

[76] Inventor: Walter C. Klingel, Sr., 4773 58th Ave. N., St. Petersburg, Fla. 33714

[21] Appl. No.: 619,725

[22] Filed: Jun. 11, 1984

Related U.S. Application Data

[63] Continuation of Ser. No. 530,117, Sep. 7, 1983, abandoned, which is a continuation of Ser. No. 310,908, Oct. 13, 1981, abandoned.

[51] Int. Cl.³ .......................... F16J 15/10; G01M 3/04
[52] U.S. Cl. .......................................... 277/228; 277/2; 277/188 R; 277/229; 277/233; 73/49.2; 73/49.8
[58] Field of Search .............. 277/2, 3, 188 R, 188 A, 277/227-229, 233, DIG. 6; 73/45.1, 49.2, 49.3, 49.6, 49.8

[56] References Cited

U.S. PATENT DOCUMENTS

| | | | |
|---|---|---|---|
| 524,162 | 8/1894 | Cochrane | 277/233 |
| 2,360,734 | 10/1944 | Smith | 277/229 X |
| 3,213,673 | 10/1965 | Schulhoff | 73/49.8 X |
| 3,622,427 | 11/1971 | Kelly | 73/49.8 X |
| 3,774,920 | 11/1973 | Sievenpiper | 277/16.5 |
| 4,027,513 | 6/1977 | De Ment et al. | 73/49.2 X |

Primary Examiner—Robert S. Ward
Attorney, Agent, or Firm—Ronald E. Smith

[57] ABSTRACT

A seal of composite construction for leak testing two piece "drawn" aluminum and steel cans and three piece welded steel cans. The novel can is formed of elastomeric materials of differing hardness which are molded together to form a single, integrally formed unit. More specifically, a core formed of a soft material is disposed in sandwiched relation to working surfaces formed of a harder material so that the beneficial and detrimental characteristics of such materials are synergistically maximized and minimized, respectively. In operation, the seal is axially displaced into and out of sealing registration with the open, flanged ends of cylinders to be used as portable containers. The hard working surfaces of the seal, or pad, resist abrasion and detect microsplits, thereby overcoming the limitations of conventional soft seals, while the soft core provides the needed resiliency, thereby overcoming the limitations of conventional hard seals.

16 Claims, 3 Drawing Figures

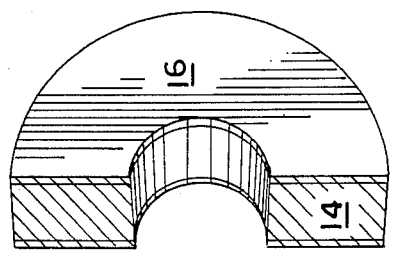
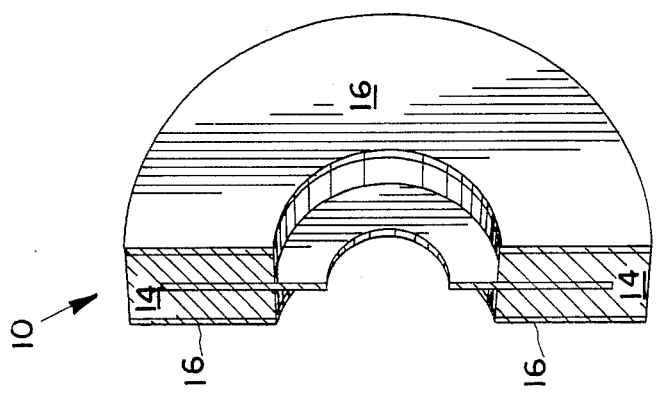
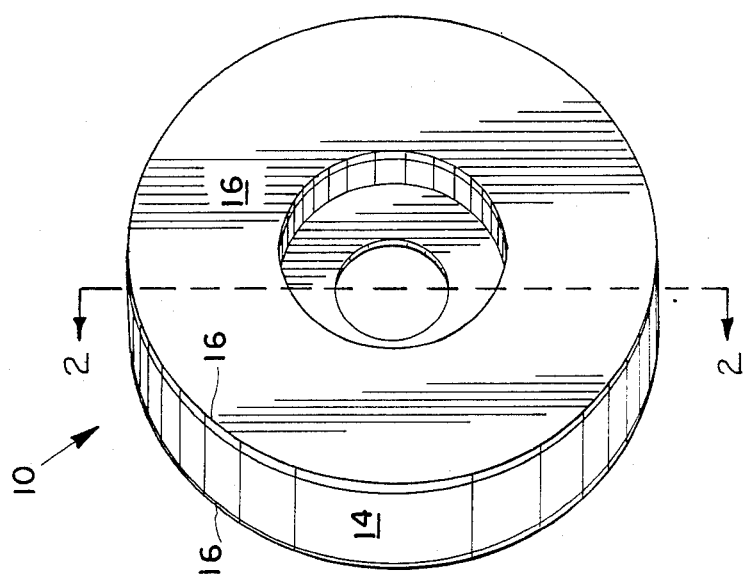

MULTI-CHARACTERISTICS SEAL MEMBER FOR TESTING UNCAPPED CONTAINER MEANS

REFERENCE TO RELATED APPLICATIONS

A continuation application of Ser. No. 530,117, filed 9/7/83 and now abandoned, which was a continuation application of Ser. No. 310,908, filed 10/13/81, and now abandoned.

BACKGROUND OF THE INVENTION

1. Field of the Invention

This invention relates generally to seals used in the container manufacturing industry when such containers are being tested for leaks, and more specifically relates to a seal having performance characteristics that allow it to be used as a seal for cans of widely varying characteristics.

2. Description of the Prior Art

Prior to the invention of the seal member disclosed hereinafter, manufacturers of aluminum and steel cans have been required to maintain in their inventory a multitude of seals of differing characteristics so that containers of differing characteristics could be tested. In other words, certain types of containers may require the use of very soft seals when such cans are leak tested, whereas other types of cans may require the use of very hard seals during such tests. Of course, the testing of most cans requires the use of seals harder than the softest seal and softer than the hardest seal. Accordingly, a complete line of seals of differing degrees of hardness have been developed by the industry, and the seal having the characteristics closest to the optimal characteristics for a particular application is selected from among all the seals available when tests are to be performed on a certain type of container.

The current state of affairs is clearly undesireable due to the low productivity associated with the task of attempting to match the appropriate seal to the container types to be tested. Mismatches commonly occur, with the result that adequately constructed cans may be rejected or, even more catastrophic, defective cans may pass the tests.

Soft seals are generally desireable, because their resiliency allows them to accommodate cans of varying lengths. (A batch of manufactured cans may vary in length by about 40/1000ths of an inch). Further, such softness permits the sealing of cans having acceptable deformities such as flanges that are only slightly out of round, or flanges having burrs which are allowed by tolerance specifications.

The primary objectional quality of soft seals, however, is their propensity to deteriorate quickly, i.e., soft seals have short useful lifetimes. The soft seals are subject to abrasion by sharp flanges and may be damaged by unflanged cans as well. Seal abrasion is disasterous since such abrasion will prevent the seal from performing its intended function-sealing a container while the container is leak tested-with the result that good cans will be rejected as leaky even though the source of the leak is the abraded seal. Often, a seal abrasion is not detected until an unusually high number of cans have been rejected, thereby casting doubt upon the effectiveness of the seal.

Abrasions also cause the cans to fail to separate from the seal after the leak test has been completed, and this failure to separate causes discharge jams which of course cause downtime.

Another serious drawback of soft seals is their ability to seal cans having microsplits in their flanges. This allows defective cans to pass the leakage test. When a bottler discovers such a leak in a can that has passed a test that supposedly ensures 100% detection of leaky cans, all cans in the suspect lot are destroyed. Thus, each mistake is multiplied many times over.

Hard seals, therefore, are often used because such seals do not seal microsplits and are also abrasion-resistant. Unfortunately, hard seals are less able to provide effective seals for cans of differing lengths, or for cans having out of round or burr-carrying flanges. Moreover, the strain on the mechanical parts that drive the seals into sealing engagement with the cans to be tested after sealing is increased when hard seals are used since increased axially directed pressure must be imparted to such hard seals to insure adequate sealing.

There is clearly a need for a single seal member that combines the desireable features of hard and soft seals while overcoming the undesireable features of such seals, but the prior art contains no teachings or suggestions on how best to provide such a seal.

SUMMARY OF THE INVENTION

The longstanding but heretofore unfulfilled need for such a seal is now provided in the form of a seal member of composite construction having a soft core disposed in sandwiched relation to harder surfaces. The soft core provides the requisite resiliency for a seal that can handle cans of differing lengths, and out of round or burr-carrying flanges, while the hard surface of the seal combats abrasion and avoids the sealing of microsplits.

It is therefore seen to be the primary object of this invention to provide a multi-purpose seal of the type used in leak testing of containers.

A closely related object is to provide a seal that exhibits the desireable properties of both hard and soft seals while not exhibiting the undesireable properties of such seals.

Another object is to provide a seal member of composite construction so that it can be economically manufactured and so that it will have a long useful lifetime.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of the novel seal.

FIG. 2 is a perspective rendering of a transverse cross sectional view of the novel seal, taken along line 2—2 of FIG. 1.

FIG. 3 is a perspective view of a second embodiment of the invention, showing the type of pad used in light testing applications (having no metallic plate embedded therein), shown in transverse cross section.

DETAILED DESCRIPTION OF THE PREFERRED EMBODIMENT

FIG. 1 depicts the novel seal, generally indicated as 10. Of course, since containers are manufactured in different sizes, the seal 10 is provided in different sizes as well.

The novel seal 10 has the general appearance of a conventional seal of the type used in rotary air testers, light testers, and in the environment of fill and seal machines, i.e., the seal 10 is generally disc shaped and is centrally apertured.

As shown in FIG. 2, a centrally apertured metal plate 12 is embedded in the seal 10, centrally thereof. Such a plate is provided in all conventional seals as well, and is the means by which the position of the seal is changed during the testing procedure. More specifically, a machine (not shown) reciprocates a rod that is inserted within said aperture and fixedly secured to said plate. Accordingly, the seal 10 is reciprocated into and out of sealing engagement with the cans to be tested attendant axial reciprocation of said rod. The mechanical aspects of such seal 10 movement do not form a part of this invention. The soft inner core 14 is formed of any elastomeric material that produces a durometer reading in the range of about 10–30. Exposing such a soft material to the harsh environment of a leak testing apparatus is contraindicated. Accordingly, the core 14 is flanked by hard surfaces 16, 16 which are formed of an abrasion-resistant material having a durometer reading in the range of about 60–90.

Both the core 14 and the skin members 16, 16 are formed of the same material at the same time in a molding process so that the product of the process will have a homogenous constituency. For clarity purposes, the seal 10 is drawn to indicate the respective boundaries between the core material and the skin material, although the product is not a laminated item since it is integrally formed.

The seal 10 can be formed of urethane, polyurethane, synthetic rubber, natural rubber, or virtually any elastomeric material having the ability to be molded and cured to provide the stratified construction shown in FIG. 2.

The skin members 16, 16 may have thicknesses ranging from about 30 to 120/1000ths of an inch, although no meaningful limits on the thickness of the core 14 may be set forth.

Empirical studies have shown that the construction set forth hereinabove enables the same seal to effectively seal a variety of differing can types. The resilience afforded by the core 14 enables the seal to effectively seal cans of differing lengths, and makes sealing adjustment easier because it allows more sealing pressure to be applied without damage to the tester.

With greater seal pressures allowed due to the presence of the soft core 14, relative to the amount of seal pressure that would be permissible in the environment of a uniformly hard seal member, cans having out of round flanges or diameter variations are effectively sealed because the hard skin 16 will tend to find the center of the seal. This centering ability of hard seals cannot be harnessed if the seal is uniformly hard, and the ability of the inventive seal 10 to harness the centering ability of the hard skin 16 is one of the synergistic features of the invention. Unflanged or partially flanged cans will not damage the skin 16, due to its hardness. Flanges carrying burrs can also be tested without damaging the hard skin 16, and good seals over the acceptable burrs can be formed as a result of the increased sealing pressures which become available due to the provision of the soft core 16. The novel seal further allows for can misalignment.

Moreover, microsplits will now be detected, since the hard skin 16 will not seal over such cracks, even with the application of increased sealing pressure.

The testing equipment can even be operated at higher speeds, since the resilient core 14 exhibits a quick reaction to the removal of pressure therefrom, which reaction is instantaneously communicated to the integrally formed skin 16, whereas uniformly hard seals are less resilient and require more time between seals.

Those skilled in the art will also appreciate that the life of the testing machine parts will be extended since the soft core 14 acts as a bias means during can transfer, thereby holding the can and allowing the clamping spring tension to be reduced, which in turn reduces the stress on the cam follower linkage of such machine.

The many synergistic effects of the novel construction collectively represent a significant advance in the art.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, a matter of language, might be said to fall therebetween.

Now that the invention has been described, that which is claimed is:

1. A static seal member of the type designed to test uncapped container means for structural imperfections known as microsplits, comprising, in combination:
   a first, flat skin portion having a first predetermined high hardness rating,
   a second, flat skin portion having a first predetermined high hardness rating,
   a core portion having a predetermined low hardness rating,
   said first and second flat skin portions disposed in sandwiching relation to said core portion and formed integrally therewith,
   said first and second flat skin portions having a thickness substantially less than the thickness of said core portion,
   said first and second flat skin portions having a diameter greater than the diameter of a container to be tested for leaks,
   said first or second flat skin portions adapted to be disposed in abutting relation to the open end of an uncapped container to be tested for leaks so that gaseous fluid attempting to escape said container will be constrained, by said first or second flat skin portions, to accomplish said escape through a defect in said container adjacent its open end.

2. The seal member of claim 1, wherein said seal member is generally disc-shaped in configuration.

3. The seal member of claim 2, wherein said seal member is centrally apertured and wherein a centrally apertured rigid plate member is embedded within said core portion of said seal member in concentric relation to said seal member so that means for axially reciprocating said seal member into and out of sealing relation with said containers may be attached to said plate member.

4. The seal member of claim 3, wherein the core portion of said seal member has a durometer reading range of 10-30.

5. The seal member of claim 3, wherein the skin portion of said seal member has a durometer reading range of 60-90.

6. The seal member of claim 3, wherein said skin portion has an axial thickness of between 30-120/1000ths of an inch.

7. The seal member of claim 3, wherein said seal is formed of rubber.

8. The seal member of claim 3, wherein said seal member is formed of synthetic rubber.

9. The seal member of claim 3, wherein said seal member is formed of urethane.

10. A testing seal member for determining integrity of a container having a blind bore and open mouth comprising in combination:
    a sealing face skin portion formed from resilient material having a durometric hardness range between 60-90, oriented to be placed over and beyond the container mouth, a supporting core inner portion having a durometric hardness range between 10-30 supporting said sealing face skin portion resiliently against the container mouth,
    said core coextensive with said sealing face but of greater thickness,
    whereby said sealing face skin portion resists damage by imperfections of the container yet conforms to the configuration of the mouth for accurate testing.

11. The seal member of claim 10 wherein said seal member is generally disc-shaped in configuration.

12. The seal member of claim 11 wherein said seal member is centrally apertured and wherein a centrally apertured rigid plate member is embedded within said core portion of said seal member in concentric relation to said seal member aperture so that means for axially reciprocating said seal member into and out of sealing relation with said containers may be attached to said plate member.

13. The seal member of claim 12 wherein said skip portion has an axial thickness of between 30-120/1000ths of an inch.

14. The seal member of claim 13 wherein a second outer skin portion is provided on a face of said seal opposite from said first skin portion, whereby both sides of said seal member can be used alternatively.

15. A seal member adapted to seal uncapped containers so that said containers can be tested for leaks, said member comprising in combination:
    an inner core portion having a durometric value less than 30,
    an outer skin portion having a durometric value greater than 60 overlying and coexstensive with said inner core portion,
    an aperture extending through said seal member including a rigid reinforcing annulus and a centrally disposed radially extending plate member,
    said seal member of generally disc-shaped configuration adapted to be placed over the uncapped container,
    said core portion and said skin portion formed from identical material and integrally formed so that a durometric boundary is provided between said skin portion and said core portion, said boundary being substantially disc-shaped,
    said skin portion having a thickness between 30 and 120/1000th of an inch,
    whereby conformation of said skin portion to the uncapped container is achieved for sealing engagement therewith yet said skin portion exhibits extended longevity.

16. The seal member of claim 15 including a second outer skin portion on a face of said core opposite from said other skin portions.

* * * * *